(12) United States Patent
Vinck et al.

(10) Patent No.: US 10,273,029 B2
(45) Date of Patent: Apr. 30, 2019

(54) PROCESSES FOR COLLATION SHRINK PACKAGING WITH A THERMALLY INSULATING FILM

(71) Applicant: ExxonMobil Chemical Patents Inc., Baytown, TX (US)

(72) Inventors: Michael J. Vinck, Cape Town (ZA); Mohamed Timol, Durban (ZA)

(73) Assignee: ExxonMobil Chemical Patents Inc., Baytown, TX (US)

( * ) Notice: Subject to any disclaimer, the term of this patent is extended or adjusted under 35 U.S.C. 154(b) by 46 days.

(21) Appl. No.: 15/566,154

(22) PCT Filed: Apr. 28, 2016

(86) PCT No.: PCT/EP2016/059458
§ 371 (c)(1),
(2) Date: Oct. 12, 2017

(87) PCT Pub. No.: WO2016/177621
PCT Pub. Date: Nov. 10, 2016

(65) Prior Publication Data
US 2018/0208345 A1 Jul. 26, 2018

(30) Foreign Application Priority Data
May 4, 2015 (EP) ..................... 15166225

(51) Int. Cl.
*B65B 53/02* (2006.01)
*B29C 48/08* (2019.01)
(Continued)

(52) U.S. Cl.
CPC .......... *B65B 53/02* (2013.01); *B29C 48/0018* (2019.02); *B29C 48/0023* (2019.02);
(Continued)

(58) Field of Classification Search
CPC ..... B65B 53/02; B65B 21/245; B65B 61/025; B32B 5/20; B32B 27/065; B32B 27/32; B32B 27/327; B32B 7/02; B32B 27/08; B32B 2250/03; B32B 2250/05; B32B 2250/40; B32B 2270/00; B32B 2307/304; B32B 2307/56; B32B 2307/736; B32B 2553/00; B32B 2553/02; B32B 2307/54; B29C 47/0004; B29C 47/0021; B29C 47/0057; B29C 47/0069; B29C 47/065;
(Continued)

(56) References Cited

U.S. PATENT DOCUMENTS 4,657,811 A 4/1987 Boyd et al.
6,187,397 B1 2/2001 Grangette
(Continued)

FOREIGN PATENT DOCUMENTS

EP 1529633 A 5/2005
EP 2653391 A 10/2013
(Continued)

*Primary Examiner* — Michael C Miggins
(74) *Attorney, Agent, or Firm* — Leandro Arechederra, III

(57) ABSTRACT

This invention relates to processes for collation shrink packaging of one or more items with a thermally insulating film, to films for such processes, to packages so made, and to methods for extruding such films. The one or more items packaged may be cans, bottles, pouches and other carriers of liquid or solids.

18 Claims, 2 Drawing Sheets

(51) Int. Cl.
| | |
|---|---|
| B29C 48/00 | (2019.01) |
| B29C 48/21 | (2019.01) |
| B32B 5/20 | (2006.01) |
| B32B 27/06 | (2006.01) |
| B32B 27/32 | (2006.01) |
| B29C 63/00 | (2006.01) |
| B29C 63/40 | (2006.01) |
| B32B 7/02 | (2019.01) |
| B32B 27/08 | (2006.01) |
| B65B 21/24 | (2006.01) |
| B65B 61/02 | (2006.01) |
| B65D 75/00 | (2006.01) |
| B65D 81/38 | (2006.01) |
| B29K 23/00 | (2006.01) |
| B29L 31/00 | (2006.01) |

(52) U.S. Cl.
CPC ............ *B29C 48/022* (2019.02); *B29C 48/08* (2019.02); *B29C 48/21* (2019.02); *B29C 63/0017* (2013.01); *B29C 63/40* (2013.01); *B32B 5/20* (2013.01); *B32B 7/02* (2013.01); *B32B 27/065* (2013.01); *B32B 27/08* (2013.01); *B32B 27/32* (2013.01); *B32B 27/327* (2013.01); *B65B 21/245* (2013.01); *B65B 61/025* (2013.01); *B65D 75/006* (2013.01); *B65D 81/3897* (2013.01); *B29C 2795/007* (2013.01); *B29K 2023/0625* (2013.01); *B29K 2023/0633* (2013.01); *B29K 2995/0049* (2013.01); *B29K 2995/0077* (2013.01); *B29L 2031/712* (2013.01); *B32B 2250/03* (2013.01); *B32B 2250/05* (2013.01); *B32B 2250/242* (2013.01); *B32B 2250/40* (2013.01); *B32B 2270/00* (2013.01); *B32B 2307/304* (2013.01); *B32B 2307/54* (2013.01); *B32B 2307/56* (2013.01); *B32B 2307/736* (2013.01); *B32B 2553/00* (2013.01); *B32B 2553/02* (2013.01)

(58) Field of Classification Search
CPC ................ B29C 63/0017; B29C 63/40; B29C 2795/007; B65D 75/006; B65D 81/3897; B29K 2023/0625; B29K 2023/0633; B29K 2995/0049; B29K 2995/0077; B29L 2031/712
See application file for complete search history.

(56) References Cited

U.S. PATENT DOCUMENTS

| | | |
|---|---|---|
| 6,255,426 B1 | 7/2001 | Lue et al. |
| 7,341,683 B2 | 3/2008 | Marrelli |
| 8,158,690 B2 | 4/2012 | Kling et al. |
| 2008/0138593 A1 | 6/2008 | Martinez |
| 2009/0110913 A1 | 4/2009 | Vinck et al. |
| 2012/0100356 A1 | 4/2012 | Ohlsson et al. |
| 2012/0228793 A1 | 9/2012 | Lendenfelzer et al. |

FOREIGN PATENT DOCUMENTS

| | | |
|---|---|---|
| EP | 2708344 A | 3/2014 |
| WO | 01/44365 A | 6/2001 |
| WO | 2004/022646 A | 3/2004 |
| WO | 2005/014672 A | 2/2005 |
| WO | 2009/109367 A | 9/2009 |
| WO | 2010/047709 A | 4/2010 |

PROCESSES FOR COLLATION SHRINK PACKAGING WITH A THERMALLY INSULATING FILM

FIELD OF INVENTION

This invention relates to processes for collation shrink packaging of one or more items with a thermally insulating film, to films for such processes, to packages so made, and to methods for extruding such films. The items packaged may be one or more cans, bottles, pouches and other carriers of liquid or solids.

BACKGROUND OF THE INVENTION

Collation Shrink Wrap Process

Beverage bottles have been incorporated into packs by shrinking a collation shrink film using heat around a number of bottles, so bundling the bottles together. Such packaging processes are commonly referred to as collation shrink packaging processes. Such processes are distinct from other bundling procedures such as wrapping items using stretch cling films or by elastically stretching a stretch hood tubular film around the items to be bundled at ambient temperature.

Collation shrink films are conventionally produced using a blown film extrusion process. The film is stretched in a molten condition in the direction of the film take up longitudinally (Machine Direction, MD stretch) at a specified draw down ratio (DDR) and transversely thereto by inflation of the extruded bubble of film (Transverse Direction, TD stretch) at a specified blow up ratio (BUR). These ratios are determined relative to the circumference and longitudinal speed of the molten film emerging from the extruder. The solidified tubular film is flattened and taken up on a roller. Typically, the tube is slit and the flat film is wound on two separate winders creating two reels of flat film. This film is then generally printed. Collation shrink films may be coextruded to form a multi-layer film structure.

During the collation shrink packaging process, the film is wrapped around the items to be bundled or packaged. Where the film edges overlap, the weight of the packaged items combined with heat used to create shrinkage fuses overlapping edges of the film together. Heat is applied to shrink the film to cause a partial reversion of the stretch. On completion, the film holds the packaged material tightly for shipping.

Generally, in coextruded multi-layer collation shrink films, shrinkage takes place in a central layer containing low density polyethylene (LDPE) with outer layers configured not so much to provide shrinkage but to provide puncture resistance and optical properties. The outer layers may contain linear low density polyethylene (LLDPE) which generally does not contribute to shrinkage.

Types of Polyethylene

LDPE is defined herein as a low density polyethylene having a density of from 0.915 to 0.935 g/cm$^3$. LDPE is often highly branched. The branching leads to an elevated shear sensitivity reflected in the melt index ratio ($I_{21.6}/I_{2.16}$) at 190° C. which ranges from 45 to 100. The melt index ratio (MIR), which is a measure of shear sensitivity, is expressed as a ratio of the melt index of the polymer determined according to ASTM D-1238, condition F, 21.6 kg at 190° C., divided by the melt index of the polymer determined according to ASTM D-1238, condition E, 2.16 kg at 190° C. The melt index ratio may be referred to herein as MIR $I_{21.6}/I_{2.16}$ at 190° C., or simply as MIR.

A further measure of the nature of the branching is provided by the Melt Strength Factor (MSF), the determination of which is described herein. Because of the general presence of long chain branching, LDPE's may have an MSF of at least 0.01 Newton.

LDPE's are typically produced using free radical initiation at high pressure and temperature and hence have a broad molecular weight distribution Mw/Mn of at least 5, as determined by GPC using a differential refractive index (DRI) detector and low angle laser light scattering (LALLS) measurements as described, for example, in WO 2010/47709-A1, incorporated herein by reference.

LLDPE is defined herein as having a density of from 0.915 g/cm$^3$ to 0.940 g/cm$^3$. The reduced density is often obtained by copolymerizing ethylene with an alpha-olefin comonomer having from 4 to 10 carbon atoms using a transition metal based catalyst system.

Certain types of LLDPE's are highly linear and lack long chain branching. This is reflected in a reduced shear sensitivity compared to LDPE. LLDPE's typically have a MIR from 16 to 40. Highly linear LLDPE's typically have an MSF of less than 0.003 Newton. Such linear LLDPE's also have a low relaxation time as determined though the Cross model, as described later herein, of less than 1 or 0.5 second.

Other types of LLDPE have some long chain branching obtained through the use of certain transition metal catalysts during the polymerization process, such as certain metallocenes. Such branched LLDPE's generally have an MSF of less than 0.01 Newton and/or more than 0.003 Newton, preferably more than 0.004 Newton, and more preferably more than 0.005 Newton, and show higher relaxation times as determined through the Cross model of at least 0.5 or 1 second.

Other forms of generally linear polyethylenes may be high density polyethylene (HDPE) having a density in excess of 0.940 g/cm$^3$ and a very low density linear polyethylene (VLDLPE) having a density of less than 0.915 g/cm$^3$. VLDLPE and LLDPE's generally have a narrow Mw/Mn of less than 5. The extent of long chain branching may be reflected inter alia in the MIR values and MSF values.

VLDLPEs may have a modest degree of long chain branching when they are produced using selected metallocene transition metal based catalyst systems and suitable process conditions during the polymerization process. Overall VLDLPE, LLDPE and HDPE have reduced long chain branching as compared to LDPE.

Prior Art Discussion

A multi-layer film with LLDPE outer layers and an LDPE core layer is described in U.S. Pat. No. 4,657,811 where the foamed core layer is prepared using an azodicarbonamide blowing agent, which serves to stiffen the film. The preparation of azodicarbonamide foaming agent masterbatches is disclosed in U.S. Pat. No. 8,158,690. There is no suggestion that the film be adapted to be flexible and be used for collation shrink application in which the shrinkage of outer LLDPE layers is utilized to thicken and increase the thermal insulation provided by the film.

A polyethylene resin foam sheet suitable for shock absorbing packaging applications is disclosed in EP 2708344-A1. The sheet is prepared in stages using coextrusion of a polyethylene foam layer followed by lamination with an oriented polypropylene (OPP) film. EP 2708344 A1 does not mention orientation of the film or shrinkage properties that would result from such orientation. The outer layer of OPP makes it highly unsuitable for collation shrink, even assuming that other film properties were to be selected for such a purpose, which is not discussed in the document. It is not suggested that the laminate can be used for collation shrink application with an attendant improvement of the thermal insulation resulting from the collation shrink step.

The film in EP 2653391A1 is said to be optimized for collation shrink applications after blown film extrusion by uniaxially orienting it in the machine direction 3 to 10 times. This results in a considerable down-gauging (i.e. thinning) of the film, and hence a reduction in the thermal insulation the film provides. This does permit use of a lower temperature to induce the shrinkage. The films are not stretched in the transverse direction. A bundling force in the transverse direction has to be provided separately by a tape. The underlying concept of EP 2653391-A1 is incompatible with the notion of collation shrinking a biaxially oriented film with an inner layer containing foamed bubbles so as to create a thicker thermally insulating film in the very collation shrinking process.

Furthermore collation shrink coextruded films with layers containing HDPE are described in EP 1529633-A1. Also collation shrink coextruded films with an LDPE layer sandwiched between conventional LLDPE layers are described in U.S. Pat. No. 6,187,397. Coextruded films with improved shrink properties using blends of LDPE with metallocene-derived polyethylenes are described in WO 2001/44365-A1. US 2009/0110913-A1 describes coextruded structures for broad range of packaging application using long chain branched LLDPE polymers.

Monolayer or coextruded films for heat shrink applications using a long chain branched LLDPE made using a suitable metallocene based catalysts system are described in WO 2004/22646-A1. The LLDPE may have an MIR ($I_{21.6}/I_{2.16}$) at 190° C. of from 30 to 80. U.S. Pat. No. 6,255,426 describes such polymers. In coextruded structures such LLDPE materials may be combined with LDPE layers. Similar structures are described in US 2012/0100356-A1. Collation shrink is mentioned as a possible application in WO 2009/109367-A1 which further describes high MIR LLDPE's produced using suitable metallocene based catalyst systems.

Outside of the field of collation shrink, foamed films or sheets have been described for example in US 2008/0138593, U.S. Pat. No. 7,341,683 and US 2012/02288793.

It is among the aims of the invention to provide procedures and films through which finely dispersed bubbles in the polymer matrix of a coextruded film layer can be used to increase thermal insulation of the packaged items and/or improve physical protection of the packaged items, while preserving other desirable package characteristics such as puncture resistance for safe handling of a bottle pack.

SUMMARY OF INVENTION

According to the invention there is a process for collation shrink packaging of one or more items, the process including:
i) wrapping one or more items to be packaged in a coextruded multi-layer collation shrink film which comprises:
A) a layer A with density reducing bubbles formed in LDPE or optionally in a blend of LDPE with a linear polyethylene, said blend of LDPE comprising at least 50 wt % LDPE, said LDPE or blend of LDPE having an MI as determined according to ASTM-D-1238 at 190° C. of from 0.1 to 2 g/10 min;
B) a polyethylene shrink layer B comprising at least 75 wt % of an LLDPE, said LLDPE having an MSF of more than 0.003 Newton, a density of from 0.915 g/cm$^3$ to 0.940 g/cm$^3$ and an MI of from 0.05 to 10 g/10 min; and
ii) heating the one or more wrapped items so that the film grips the wrapped items by shrinkage while increasing in thickness to form a thermally insulating wrap around the items packaged.

DETAILED DESCRIPTION

Figure 1:
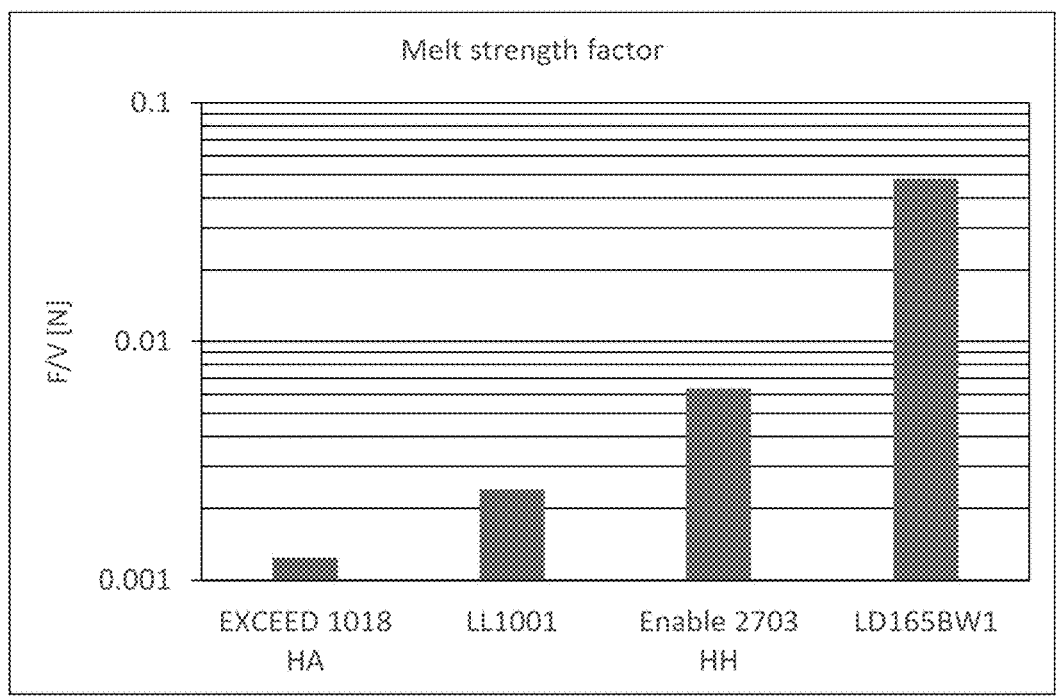
FIG. 1 is a comparison of the MSF values for different polyethylenes.

In this specification, wt % are expressed with respect of the total weight of polymer, excluding non-polymeric additives such as blowing agents.

Although the phrase "collation shrink packaging" has traditionally implied packaging of more than one item, it is understood herein that the processes and films disclosed herein may be used to package only one item, for example, a single bottle, or more than one items.

The invention relates to a process for collation shrink packaging of one or more items, as defined in the claims. In a first step, one or more items are packaged in a coextruded multi-layer collation shrink film which comprises a layer A with density reducing bubbles and a polyethylene shrink layer B. The bubbles present in layer A reduce the density of layer A compared to a layer of the same composition without such bubbles. Sufficient bubbles are formed in layer A to bring the density below that of layer B. The shrink layer B preferably has the density of the polymer composition that layer B is made of, and is substantially devoid of bubbles so as to maximize the shrink forces exerted by the layers B.

In the collation shrink wrap step (ii), the shrinkage compresses the area for a given amount of bubbles. A significant thickening of the film occurs, with the bubbles separating the outer film layers.

Advantageously, the LLDPE in shrink layer B has a relaxation time, as calculated from determinations of shear rate and viscosity at 190° C. and by using the Cross model, of at least 0.5 second, such as at least 1 second. The relaxation time is associated with a level of long chain branching enhancing shrinkage.

Preferably the LDPE in the reduced density layer A has a relaxation time, as calculated from determinations of shear rate and viscosity at 190° C., using the Cross model, of at least 10 seconds. This is believed to reflect the presence of a high level of long chain branching present which also enhances the melt strength factor (MSF), and the containment of the bubbles in layer A.

Advantageously the MSF, measured as described herein, of the LDPE in layer A and the MSF of the LLDPE in shrink layer B differ by at least 0.01 Newton, such as at least 0.025 Newton.

Preferably the MI of shrink layer B is at least 0.05 g/10 min, such as at least 0.1 g/10 min, or at least 0.2 g/10 min, such as at least 0.5 g/10 min and/or less than 10 g/min, such as less than 5 g/10 min, or less than 1 g/10 min. Suitably, after step ii), layer A has a density of from 0.6 to 0.2 g/cm$^3$. Preferably the coextruded multi-layer film is biaxially oriented and upon heating in step (ii) shrinks in both machine and transverse direction. Preferably the film shrinks by 20% in both machine and transverse directions when wrapped around the item or items and submitted to a temperature of 190° C. for 10 seconds.

The film may contain layers C of another type than layer A or layer B, that is, layers C that do not contain density reducing bubbles and/or layers that are not adapted to promote shrinkage. Preferably, a layer that does not contain density reducing bubbles, which may or may not be the shrink layer B, lies adjacent to both sides of the reduced density layer A. Preferably the film has a symmetrical structure in cross-section.

There may be a layer B on each side of layer A. The film may have different multi-layer configurations. In use of the film for collation packaging, the film shrinks around an article or articles and thickens as the film shrinks. Layer A contributes little if anything to the shrinkage because of the disrupting presence of the bubbles. The shrinkage of the layer(s) B overcomes this and helps contract the layer A to form a thermally insulating layer.

Suitably the layer A comprises at least 50 wt %, such as at least 70 wt % LDPE and optionally no more than 30 wt %, such as no more than 20, or no more than 10 wt % of a linear polyethylene, such as an LLDPE, having a relaxation time of less than 1 second. Layer B suitably comprises at least 75 wt %, such as at least 90 wt % of the LLDPE having a melt strength of more than 0.003 Newton.

Preferably the layers A and B are adjacent, without any intervening film layer and preferably form a B/A/B structure. If a layer C is present, suitably that layer is adjacent to both sides of the reduced density layer A), and preferably has a C/A/B/A/C structure with layers C forming the film surface and being a linear low density polyethylene having a relaxation time as calculated from determinations of shear rate and viscosity at 190° C. of less than 0.01 seconds.

The relaxation time is calculated from determinations of shear rate and viscosity at 190° C., as described in US 2009/0110913 and WO 2005/014672, incorporated herein by reference. The relaxation time is rheologically derived and reflects the time taken for the polymer chains to relax after deformation in a molten condition. It is influenced by aspects of the polymer structure such as the long chain branching level, molecular weight and molecular weight distribution. If the relaxation time is too high, the polymer may strain harden prematurely during cold stretching. A higher relaxation time encourages balanced melt orientation of the film during blown film extrusion.

To measure the relaxation time, experimental rheological data is interpreted using the Cross model as described for example in the "Encyclopedia of Polymer Science and Engineering" Volume 14 published by John Wiley and Sons 1988. Page 458 refers to the Cross equation. Three factors serve as the three input values of the Cross model. These factors are varied iteratively until the output curve predicted by the Cross model provides a best fit for the actual rheological data measured. The three factors are a) zero shear viscosity; b) relaxation time; and c) power law index. The Cross model inter-relates them as follows:

$$\text{Shear Stress} = (\text{Zero shear viscosity} \cdot \text{shear rate})/(1+\lambda \cdot \text{shear rate})^M,$$

wherein Lambda ($\lambda$) is the relaxation time, and M is the power low index. The zero shear is indicative of the plateau viscosity. M is indicative of the slope of the shear curve in the high shear rate region.

The relaxation time can be determined using a Rheometrics ARES which scans and collects data in accordance with ASTM D4440 R-020. The polymer is melted and brought to the target temperature and then subjected to different shear rates applied by an oscillatory probe. The rheological data so gathered are interpreted using the Cross model, using a reverse calculation in which the three input values of the Cross model (among which the relaxation time) are derived from a predicted viscosity-shear stress curve. The data measured at 190° C. is used to determine a predicted curve using the Cross model function in an iterative manner using the loss function of minimum square difference of viscosity to provide best fit, until the final iterations of the Cross model produce a curve sufficiently close to the data points plotted. A final curve is produced with certain values for the three input variables in the Cross model. The three unknown inputs of the Cross model are varied in the course of iterations until the best fit results. Thus the value of the three inputs for that particular set of measured data points that yield the best fit is determined. The predicted values of viscosity and shear stress are determined incidentally.

Provided a sufficiently complete scan is used as the basis for the calculation, the resulting relaxation time is otherwise independent of the measurement and calculation methodology used. While the relaxation time is influenced by the molecular weight, within a relatively constrained range of molecular weights, differences in relaxation time are indicative of differences in levels of long chain branching with more branching leading to higher relaxation times.

The Melt Strength Factor, MSF, is measured as follows. Molten polymer is stretched upon extrusion using a Göttfert Rheotester 1000 device attached to a Göttfert high-pressure capillary rheometer Rheotens 71.97 and the data recorded using a LabRheo computer program. The melt is extruded through a die of known geometry at constant plunger speed such that a constant apparent wall shear rate is imposed. The extruder melt is subsequently stretched by a pair of toothed wheels at a known distance from the die. The frequency of rotation of the wheels is increased linearly with time while the draw down force is recorded. This stretching process is non homogeneous and non-isothermal, but it is close to actual extrusion processing conditions. Cooling boxes can be mounted on the Rheotens filled with ethanol to cool the rotating wheels to prevent sticking if necessary.

The samples are extruded on the Rheotester at a test temperature of 190° C., using a die having an L/D ratio of 30 mm over 2 mm, a test piston of 12 mm, a piston speed of 0.5 mm/sec at a shear rate of 72 sec$^{-1}$. Other test conditions include: a start speed $V_0$ of 18 mm/s (initial rotating speed of the wheels). The Rheotens provided a gap between the wheels of 0.7 mm between the die and the grooved wheels where the extruded strand is placed but the gap may very depending on the die swell; a length of 122 mm between the end-of-die to the nip between the-wheels; a strand break detection and cut off pull-off speed of 1900 mm/s; a sample rate per second of 100 and a maximum test time of 100 seconds; and a variable strand acceleration of 12 mm/s$^2$.

The test is used to measure the Melt Strength Factor which is the ratio FN, where F is the pull off force in Newton when the strand breaks or slips and V is the Draw ratio. The Draw ratio is itself the ratio at break of the wheel pull-off speed, $v_b$, and the extrusion speed at the die exit, $v_0$.

The MSF values for different polyethylenes can be compared by reference to FIG. 1 which shows the MSF values of different polyethylenes determined as described herein. In FIG. 1 Exceed™ is a highly linear, homogeneous LLDPE made using metallocene catalyst under circumstances not favoring formation of long chain branches. LL1001 is a more heterogeneous LLDPE grade made using a titanium based Ziegler-Natta catalyst system, and is also substantively devoid of long chain branches.

Layer A mostly contains LDPE but may contain a limited amount a linear polyethylene, such as an LLDPE or HDPE. This admixed linear polyethylene may have some long chain branching and a relaxation time of at least 0.5 or 1 sec or have no long chain branching and a relaxation time of less than 1 sec, such as less than 0.5 sec. Preferably, layer A comprises at least 50 wt % of LDPE and more preferably at least 70 wt % LDPE and optionally no more than 20-30% of linear polyethylene, more preferably less than 10 wt % of linear polyethylene.

Layer B may be an LLDPE such as an Enable™ polyethylene polymer produced by ExxonMobil Chemical Company having a proper level of long chain branching to provide a relaxation time of at least 0.1 sec, such as at least 0.5 sec or at least 1 sec or may be a blend of such a polymer with another polymer. Overall the MSF should be sufficient to sustain the film bubbles during extrusion and provide a high enough relaxation time in the layer(s) to impart shrinkage. Preferably, layer B comprises from at least 75 wt % of a metallocene derived LLDPE, more preferably having a relaxation time as calculated from determinations of shear rate and viscosity at 190° C. using the Cross model of at least 0.5 sec, such as at least 1 sec.

Layer A may have an overall melt index (MI) of from 0.1 to 2 g/10 min. All MI data is gathered according to ASTM D-1238. The MI is measured at 190° C. and 2.16 kg load.

If a layer C is present, that layer can be used to optimize gloss and puncture resistance. For example, the predominant polymer component of layer C may be a metallocene derived LLDPE with little or no long chain branching and a relaxation time of less than 1 sec, such as less than 0.5 sec and/or an MSF of less than 0.003 Newton.

The invention further provides that the collation shrink film may be prepared using a blown film extruder by:
I) admixing a blowing agent into the polymer used for layer A;
II) extruding layers A and B;
III) stretching the extruded film at a draw down ratio of from 2 to 20 and a blow up ratio of from 2.0 to 4.5 by inflation; and
IV) taking up the film.

The amount of blowing agent can be varied in order to control the extent of bubble formation. A physical blowing agent may be injected under pressure, such as butane. Suitably a chemical blowing agent is used, preferably endothermic. The blowing agent is preferably used in amounts of 0.5 to 2 wt % based on the total weight of polymer in the layer in which it is used. Suitable endothermic blowing agents include azodicarbonamide. Enough blowing agent should be used to provide the desired film thickness after the collation shrink packaging process is completed, but the amount should not be so high as to cause the bubbles to perforate the surface of the film. A fine distribution of the blowing agent in the extruder melt is preferably promoted by adding the blowing agent in the form of a masterbatch in which the blowing agent is concentrated. Preferably a masterbatch is used, most preferably a masterbatch of an azocarbonamide blowing agent which comprises a) from 95 to 70 wt % of a carrier polymer having an MI of from 2 to 20 g/10 min and a melting point as measured by DSC well below the point at which the blowing agent starts to decompose, and b) from 5 to 30 wt % of the azodicarbonamide. Preferably, the carrier polymer has a melting point as determined by DSC of from 50 to 105° C. Suitably the carrier polymer contains from 75 to 95 wt % of units derived from propylene and a balance of units derived from ethylene.

In the processes disclosed herein, the film may be printed with text or graphics at any point, and preferably after heating in step ii). The printed film may be used as a packaging label for the one or more items.

Example

A) Preparing the Film
    Starting materials:

| Polymer | Density $(g/cm^3)^{1)}$ | MI $(g/10\ min)^{2)}$ | $MIR^{3)}$ | Relaxation time (sec) | $Tm\ (°\ C.)^{4)}$ | $Mw/Mn^{5)}$ |
|---|---|---|---|---|---|---|
| Enable ™ 27-03 HH | 0.927 | 0.3 | 55 | >0.5 sec | 128 | 2-3 |
| Escorene ™ LD165BW1 | 0.922 | 0.3 | 85 | >10 sec | 107 | 5-8 |
| Vistamaxx ™ 6502 | 0.876 | 20 | NA | NA | | Bimodal |
| Hydrocerol ™ blowing agent | NA | NA | NA | NA | NA | NA |

NA in the table indicates not available or not applicable
[1] Test method based on ASTM D-4703-03/ASTM D-1505/ISO 1183
[2] Test method based on ASTM D-1238/ISO 1133B - Measured at 190° C. and 2.16 kg load.
[3] Ratio of the melt index of the polymer determined according to ASTM D-1238, condition F, 21.6 kg at 190° C., divided by the melt index of the polymer determined according to ASTM D-1238, condition E, 2.16 kg at 190° C.
[4] Test method based on ASTM D-3417/D-3418
[5] Determined using GPC DRI/Lalls as described in WO201047709A1.
Enable ™ 27-03 HH had an MSF value as determined by the method described herein of about 0.006 Newton.
Escorene ™ LD165BW1 had an MSF value of about 0.05 Newton.

The relaxation times for Escorene LD165BW1 (also referred to as an ExxonMobil LDPE grade) and Escorene™ LD165BW1 were determined by measuring its shear stress behavior these materials as described herein.

Enable™ 27-03 HH: metallocene polyethylene available from ExxonMobil Chemical Company. Enable grades are produced by a gas phase polymerization process using ethylene and 1-hexene as comonomer and a supported metallocene catalyst system. The Enable polymers have a density range similar to conventional LLDPE's of 0.91 g/cm³ to 0.94 g/cm³. Unlike conventional LLDPE's, Enable grades have a significant level of long chain branches as is evident from relaxation times that are higher than 0.5 sec or even higher than 1 sec, while also having a narrow Mw/Mn.

Escorene™ LD165BW1: LDPE available from Exxon-Mobil Chemical Company. It is a polyethylene produced using a high pressure process using free-radical initiators. LDPE polymers may have high levels of long chain branching and a relatively broad molecular weight distributions.

Vistamaxx™ 6502: a propylene based elastomer containing ethylene as comonomer, also available from ExxonMobil Chemical Company.

Hydrocerol™ is an azodicarbonamide blowing agent available from Clariant Masterbatch GmbH that decomposes endothermically for better process control. The blowing agent may be added in powder form and dispersed in to the polymer or polymer blend making up layer A. Alternatively it may be prepared using a master batch.

In case a master batch approach is used, Vistamaxx™ 6502 (80 wt %) may be blended with 20 wt % of powdered Hydrocerol™ blowing agent in a mixer at a temperature of no more than 125° C. until an even dispersion of the powder particles in the polymer matrix results. In this example, the core layer (layer A) contained approximately 1 wt % of the blowing agent added directly to the polymer for layer A.

B) Extruding the Film

The materials were fed to the feed hoppers of a Kiefel Kirion blown film extruder. The molten mix inside the extruder reached a temperature of 190° C. at an estimated pressure of >400 bar, causing the azodicarbonamide blowing agent to decompose but suppressing the formation of bubbles. The residue of the blowing agent dissolved evenly in the LDPE. Upon exiting the die, the residue formed came out of solution and formed finely divided bubbles that reduced the overall film density. The bubbles did not break through the film surface formed by the thin layer of Enable 27-03HH on either side of the core layer. The film was thought to roughly double to triple in thickness due to the bubble and foam formation.

The blown film bubble formed by extrusion was inflated at a blow up ratio of approximately 3 and taken up at a draw down ratio of between 10 and 30. The film was hence biaxially oriented. The formation of the bubbles caused a lowering of the density.

The outcome can be summarized as follows:

| | Materials used | Thickness in inflated film[1] | Density | Bubble quality/ Average size |
|---|---|---|---|---|
| Surface shrink layer B | Pellets of Enable 27-03HH | 20-30 micron | 0.927 g/cm$^3$ | None |
| Core reduced density layer A | Dry blend of 99 wt % LDPE and 1 wt % blowing agent added as powder. | 40-80 microns | 0.500 g/cm$^3$ | Fine |
| Surface shrink layer B | Pellets of Enable 27-032HH | 20-30 micron | 0.927 g/cm$^3$ | None |

[1] Measured after extrusion at the frost line.

Figure 2:
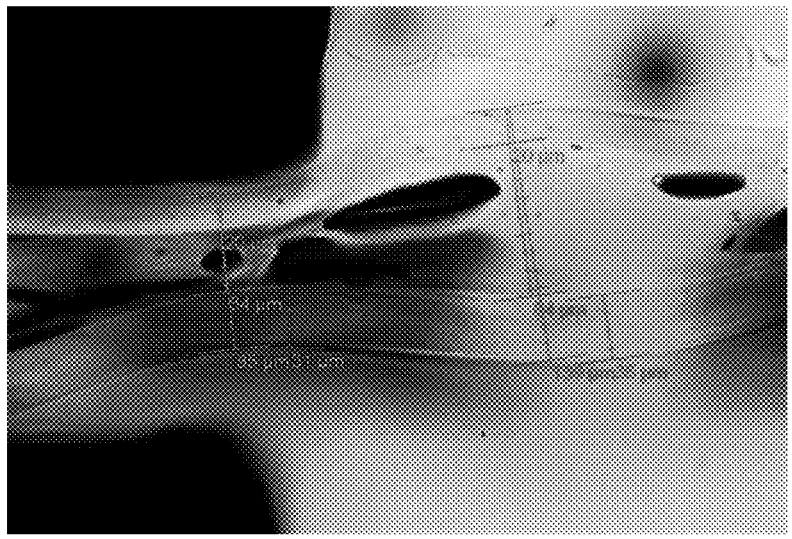
FIG. 2 is a microscopy photograph of a film sample according to the invention, as further described in the Example.

The thickness of the cooled coextruded film and its constituent layers was determined as follows: A sample of exactly 10 cm$^2$ was weighed. The total thickness was measured using a micrometer. The volume was calculated from the product of area times the thickness. The density was calculated from the weight and the volume of the film sample. The layer distribution of the same sample was measured using optical microscopy by measuring the thickness of each constituent layer. The outside layer was assumed to be uniform in thickness and have a density of 0.927 g/cm$^3$ as it consisted entirely of Enable 27-03HH which has an average resin density of 0.927 g/cm$^3$. Given the density of the film overall, the layer distribution and the density of the two outside layers and the core layer density can be calculated. FIG. 2 of the drawings shows a microscopy photograph of the film cut in a transverse direction with clearly visible flattened bubbles appearing more darkly.

C) Collation Shrink Packaging Process

Arrays of filled beverage bottles were enveloped with the film which was then cut to separate each array and passed into a tunnel heated to about 190° C. for approximately 10 seconds. As a result the film shrank and bundled the array. The density is may increase by heating of the bubbles but essentially the shape of the bubbles changes as a result of the shrinking of the film. This coincides with a significant increase in the distance between the film surfaces and hence its ability to provide thermal insulation. The film has the potential of shrinking approximately 70% in MD and 30% in TD relative to the un-shrunk film. The film remained white indicating that the internal bubbles of the foam remained intact inside the film and did not break through to the surface.

Figure 3:
FIG. 3 is a microscopy photograph of a film sample according to the invention, as further described in the Example.

In the process of shrinking and thickening, the film also stiffened upon cooling, further enhancing the mechanical integrity of the pack as expressed by a holding force of 3.4 N and energy at break in MD of 28 mJ/mm$^3$. FIG. 3 of the drawings shows a microscopy photograph with the bubbles migrated towards each other and increasing the separation of the surface layers. The shrink forces were measured on a Retratech unit based on ISO14616 showing an averaged shrink rate of 54%.

The variations in film thickness that occurred during the successive processing steps are summarized below:

| | Thickness after foam formation and bubble expansion at the frost line | Thickness after unconstrained shrinkage |
|---|---|---|
| Surface layers B | 20-30 micron | 80-120 micron |
| Reduced density layer A | 40-80 micron | 180-280 micron |
| Total of layers | 80-140 micron | 340-520 micron |

In the actual packaging process, shrinkage is of course not homogeneous and restricted by the shape of the items being packaged. The layer A may have a final density of 0.6 g/cm$^3$ or less in unconstrained areas.

Enable LLDPE is especially advantageous because it ensures that sufficient shrinkage can be imparted to a thin film of less than 100 μm in the collation shrink packaging tunnel in spite of the fact the core layer of LDPE is intersected with fine bubbles. Without wishing to be bound by the theory, Enable LLDPE has a relatively low level of long chain branching, so that, upon expansion of the bubbles in layer A, the film is deformed, but the bubbles do not perforate the film. It is believed that the core LDPE layer does not provide significant resistance to the shrinkage and does not actively contribute to film shrinkage due to the presence of the bubbles. The high melt tension of the LDPE in the core layer does however facilitates the ready expansion of the individual bubbles when the film exits the die. The high shear sensitivity of the LDPE contributes to the formation of sufficiently fine internal film bubbles.

In tests, the packaged bundles were kept refrigerated and brought to a temperature approximating 5° C. When the bundle was removed from the refrigerator, it was significantly slower to heat to ambient temperature than when using a collation shrink film not having internal bubbles. The package was still 5° C. cooler than a non-foamed pack after 1 hour.

The process of the invention uses conventional collation shrink packaging conditions to both wrap and thermally insulate the packaged items in a single step using the unique inventive film structure. The film remains able to shrink in spite of the main internal layers being expanded by the foam formation. The additional thickening of the foamed layer in the collation shrink process can be achieved without detracting from overall mechanical integrity of the package.

The films disclosed herein are useful in shrink wrap film applications. For example, the films are useful in wrapping bottles, cans, containers, cartons, pouches, tubs, boxes, and/or palettes, and in particular where insulation, e.g., thermal insulation, would be useful to maintain the temperature of the wrapped item or items. Additionally, the insulation may also be used to stabilize the products, unitize them, keep them clean, add tamper resistance, assist in handling and transportation of the products, prevent damage, and/or add shock absorption. Suitable items include, without limitation, foods (e.g., flexible food packaging and frozen food packaging) such as prepared foods, produce, meat, fish, poultry, seafood, cheeses, dessert items and ice cream, and any combination thereof, and beverages such as drinks, soft drinks, coffee, teas, juices (e.g., fruit, vegetable, and mixtures thereof), energy drinks, sports drinks, alcoholic beverages (e.g., beers and ales), milk, water, and any combination thereof.

It will also be appreciated that the films disclosed herein might also be used to wrap home/household and industrial products such as chemicals, electronics, healthcare items, medicines and other medical products, plants, flowers, and herbs.

One or more layers of the films may be modified by conventional post-forming techniques such as corona discharge, chemical treatment, flame treatment, and any combination thereof. One or more layers of the films, for example, the outer layer or skin layer, may be printed, embossed, metallized, and any combination thereof. One or more layers may contain dyes, hues, pigments, and any combination thereof.

What is claimed is:

1. Process for collation shrink packaging of one or more items including:
   i) wrapping one or more items to be packaged in a coextruded multi-layer collation shrink film which comprises:
   A) a layer A with density reducing bubbles formed in LDPE or optionally in a blend of LDPE with a linear polyethylene, said blend of LDPE comprising at least 50 wt % of LDPE, said LDPE or blend of LDPE blend having an MI as determined according to ASTM-D-1238 at 190° C. of from 0.1 to 2 g/10 min;
   B) a polyethylene shrink layer B comprising at least 75 wt % of an LLDPE, said LLDPE having an MSF of more than 0.003 Newton, a density of from 0.915 $g/cm^3$ to 0.940 $g/cm^3$ and an MI of from 0.05 to 10 g/10 min; and
   ii) heating the one or more wrapped items so that the film grips the one or more wrapped items by shrinkage while increasing in thickness to form a thermally insulating wrap around the items packaged.

2. Process according to claim 1, wherein the LLDPE in shrink layer B has a relaxation time as calculated from determinations of shear rate and viscosity at 190° C., using the Cross model of at least 0.1 second.

3. Process according to claim 1, wherein the LDPE in the reduced density layer A has a relaxation time as calculated from determinations of shear rate and viscosity at 190° C., using the Cross model, of at least 10 seconds.

4. Process according to claim 1, wherein the MSF measured as described herein of the LDPE in the reduced density layer A and the LLDPE in shrink layer B differ by at least 0.01 Newton.

5. Process according to claim 1, wherein the LLDPE in shrink layer B has been produced by a polymerization process using a metallocene catalyst.

6. Process according to claim 1, wherein the MI of shrink layer B is at least 0.2 g/10 min and/or 1 g/10 min or less.

7. Process according to claim 1, wherein the coextruded multi-layer film is biaxially oriented and upon heating in step (ii), shrinks by at least 20% in both machine and transverse directions when submitted to a temperature of 190° C. for 10 seconds.

8. Process according to claim 1, wherein, after step ii), layer A has a density of from 0.6 to 0.2 $g/cm^3$.

9. Process according to claim 1, wherein the layer A comprises at least 70 wt % LDPE and optionally no more than to 10 wt % of linear polyethylene having a relaxation time of less than 1 second.

10. Process according claim 1, wherein the layers A and B are adjacent, without any intervening film layer and preferably form a B/A/B structure.

11. Process according to claim 1, wherein the film used in step (i) is made using a blown film extruder by:
   I) admixing a chemical blowing agent, preferably an endothermic chemical blowing agent, into the polymer used to form layer A;
   II) extruding layers A and B;
   III) stretching the extruded film at a draw down ratio of from 2 to 20 and a blow up ratio of from 2.0 to 4.5 by inflation; and
   IV) taking up the film.

12. Process according to claim 1, wherein the one or more items is a single item.

13. Process according to claim 1, wherein the layer B comprises at least 90 wt % of the LLDPE having an MSF of more than 0.003 Newton.

14. Process according to claim 1, wherein a layer C lies adjacent to both sides of the reduced density layer A.

15. Process according to claim 14, wherein the film has a C/A/B/A/C structure and layers C form the film surface and comprise linear low density polyethylene having a relaxation time as calculated from determinations of shear rate and viscosity at 190° C. of less than 1 second and/or an MSF of less than 0.003 Newton.

16. Process according to claim 1, wherein the film is printed with text or graphics after step ii).

17. Process according to claim 16, wherein the printed film is a packaging label for the one or more items.

18. A collation pack comprising one or more articles and a film bundling the one or more articles, said film having been heat shrunk into position by the process according to claim 1.

* * * * *